(12) United States Patent
Shimoharai et al.

(10) Patent No.: US 10,550,262 B2
(45) Date of Patent: Feb. 4, 2020

(54) INFRARED-LIGHT-TRANSMITTING POLYESTER RESIN COMPOSITION

(71) Applicant: TOYOBO CO., LTD., Osaka (JP)

(72) Inventors: Takuya Shimoharai, Shiga (JP); Junichi Yasui, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 94 days.

(21) Appl. No.: 15/569,245

(22) PCT Filed: May 26, 2016

(86) PCT No.: PCT/JP2016/065555
§ 371 (c)(1),
(2) Date: Oct. 25, 2017

(87) PCT Pub. No.: WO2016/194758
PCT Pub. Date: Dec. 8, 2016

(65) Prior Publication Data
US 2018/0319975 A1 Nov. 8, 2018

(30) Foreign Application Priority Data
May 29, 2015 (JP) .................................. 2015-109701

(51) Int. Cl.
| C08L 67/02 | (2006.01) |
| F21V 7/24 | (2018.01) |
| C08K 3/22 | (2006.01) |
| C08K 3/26 | (2006.01) |
| C08K 3/30 | (2006.01) |
| C08L 25/06 | (2006.01) |
| C08L 25/14 | (2006.01) |
| C08K 3/34 | (2006.01) |

(52) U.S. Cl.
CPC ................ *C08L 67/02* (2013.01); *C08K 3/22* (2013.01); *C08K 3/26* (2013.01); *C08K 3/30* (2013.01); *C08L 25/06* (2013.01); *F21V 7/24* (2018.02); *C08K 3/346* (2013.01); *C08K 2003/2241* (2013.01); *C08K 2003/2265* (2013.01); *C08K 2003/3045* (2013.01); *C08K 2201/005* (2013.01); *C08L 25/14* (2013.01)

(58) Field of Classification Search
CPC ........... C08L 67/02; C08L 25/14; C08L 67/03
See application file for complete search history.

(56) References Cited

U.S. PATENT DOCUMENTS

| 7,396,428 B2 * | 7/2008 | Matsushima | B29C 66/73921 156/272.8 |
| 2002/0002225 A1 * | 1/2002 | Reil | B29C 66/7332 524/358 |
| 2005/0119377 A1 * | 6/2005 | Ishii | B29C 65/1635 524/88 |
| 2007/0129475 A1 * | 6/2007 | Sakata | B29C 65/1635 524/306 |
| 2007/0290172 A1 * | 12/2007 | Momose | C08J 3/226 252/301.16 |
| 2019/0079562 A1 * | 3/2019 | Sumi | C09B 5/60 |

FOREIGN PATENT DOCUMENTS

| EP | 2 672 170 | 12/2013 |
| JP | 2004-315805 | 11/2004 |
| JP | 2005-330466 | 12/2005 |
| JP | 2008/106217 | 5/2008 |
| JP | 2008-229852 | 10/2008 |
| JP | 5034217 | 9/2012 |
| JP | 2012-219168 | 11/2012 |
| JP | 2014-125588 | 7/2014 |
| JP | 2015-8138 | 1/2015 |
| WO | 03/099939 | 12/2003 |
| WO | 2009/005064 | 1/2009 |

OTHER PUBLICATIONS

International Search Report dated Jul. 26, 2016 in International (PCT) Application No. PCT/JP2016/065555.

* cited by examiner

*Primary Examiner* — Brieann R Johnston
(74) *Attorney, Agent, or Firm* — Wenderoth, Lind & Ponack, L.L.P.

(57) ABSTRACT

The present invention relates to a polyester resin composition which has an excellent infrared light-transmitting property, and is excellent in heat resistance and low gas emission, and is suitable for use as black colored design parts (particularly as lamp parts). According to the present invention, there is provided a polyester resin composition containing, per 100 parts by mass of a polyester resin, 0.005 to 20 part(s) by mass of an inorganic filler that has an average particle size of 3 μm or less, 0.05 to 3 part(s) by mass of a polyfunctional glycidyl group-containing styrene polymer and 0.5 to 3 part(s) by mass of an infrared light-transmitting black dye, wherein the polyester resin composition satisfies the following requirements (1) and (2). (1) An average value of transmittances, for wavelengths of 800 to 1100 nm, of a flat plate that is obtained from the polyester resin composition and has a thickness of 2 mm is 5% or higher and less than 20%. (2) Color-L ≤ 7.

4 Claims, No Drawings

INFRARED-LIGHT-TRANSMITTING POLYESTER RESIN COMPOSITION

TECHNICAL FIELD OF THE INVENTION

The present invention relates to a polyester resin composition which has an infrared light-transmitting property, and is excellent in heat resistance and low gas emission, and is suitable for use as black colored design parts (particularly as lamp parts).

BACKGROUND ART

A polybutylene terephthalate resin is excellent in an injection molding property, mechanical characteristics, a heat resistance, electric characteristics, a resistance to chemicals, etc. Utilizing these properties, the polybutylene terephthalate resin has been widely utilized as products by an injection molding in fields of automobile parts, machine parts, electro-communication parts, etc. Further, it is also excellent in a mold transfer property and is advantageously used also in lamp members such as extension uses of automobiles for which a good external appearance is particularly demanded. Furthermore, in view of its use, it is necessary to highly control the heat resistance of the resin, and a suppression of gas generation (low gas emission) upon the molding, etc.

On the other hand, an LED light has been installed for headlamps of high-class automobiles in recent years and a lamp design has been also started in a drastic change from the former one. For example, in a reflector type (a type wherein a light from a light source is irradiated by means of reflection using a reflector), it is necessary that an area around the light source is metallized with aluminum. Recently, a new design has been appearing wherein the reflector type is changed to a projector type (a type wherein the light from the light source is irradiated by condensing to a front lens) and the area around the light source is changed to a black colored design. However, due to this change, there has been resulted a problem of condensation of a sunlight. That is, when the sunlight is reflected by a projector lens and is condensed to a surrounding black area, a temperature of the condensed area becomes very high whereby a surface melting occurs. (Such a phenomenon itself has been known from old time already but, up to now, it has not caused any particular problem in view of a lamp design.) Taking such a problem into consideration, there has been a demand for materials which transmit infrared light so that the temperature does not increase even by the condensation of the sunlight and also for materials which have a heat resistance resulting in no surface melting even at the high temperature.

As to a technique for transmitting the infrared light, there are disclosures, for example, in Patent Documents 1 to 3 for a resin composition containing a resin consisting of polybutylene terephthalate or of polybutylene terephthalate and a polybutylene terephthalate copolymer together with a noncrystalline resin such as a polycarbonate resin, a styrene acrylonitrile resin, a polyester resin containing 1,4-cyclohexanedimethanol ingredient, etc. However, although this technique is useful for enhancing the infrared light transmittance of the resin of a polybutylene terephthalate type, a heat deflection temperature significantly lowers by addition of the noncrystalline resin. Accordingly, it is difficult to practically use this resin composition particularly as a lamp part.

In addition, as to a technique for preparing a black colored polyester resin composition which suppresses a temperature rise due to irradiation of a sunlight, there is disclosed, for example, in Patent Document 4 for a polyethylene terephthalate resin composition which does not contain carbon black but contains a pigment which is made into black color by mixing several pigments. According to this invention, it is possible to lower a temperature corresponding to a heat quantity accumulated by an infrared light-absorbability of carbon black, as a result of the use of the pigment of a non-carbon black type. However, an effect of suppressing the temperature rise thereby is small and, accordingly, there is yet a room for improvement.

PRIOR ART DOCUMENTS

Patent Documents

Patent Document 1: Japanese Patent Application Laid-Open (JP-A) No. 2004-315805
Patent Document 2: Japanese Patent No. 5034217
Patent Document 3: Japanese Patent Application Laid-Open (JP-A) No. 2008-106217
Patent Document 4: Japanese Patent Application Laid-Open (JP-A) No. 2014-125588

DISCLOSURE OF THE INVENTION

Problem that the Invention is to Solve

The present invention has been achieved based on a background of the problems in the prior art as such. In other words, the present invention aims to provide a polyester resin composition which has an infrared light-transmitting property, and is excellent in heat resistance and low gas emission, and is suitable for use as black colored design parts (particularly as lamp parts).

Means for Solving the Problem

As to an effective means for solving the above problems, it is conceivable to prepare an infrared light-transmitting resin using a black dye having an infrared light-transmitting property as a coloring agent for the resin. The resin as such transmits a light in an infrared region of the sunlight. Accordingly, it is now possible to quite effectively suppress the temperature rise even when the light is condensed.

However, in a crystalline resin, it is frequently difficult to achieve a dark color due to a high whiteness degree derived from a crystalline phase. On the other hand, it is usual that a dye is hardly soluble in the crystalline resin. Accordingly, when the dye is excessively added for making the color dark, a worsening of bleeding or fogging frequently becomes a problem.

The inventors of the present invention have conducted eager investigations and achieved the present invention.

Thus, the present invention has the following constitutions.

[1] A polyester resin composition containing, per 100 parts by mass of a polyester resin (A), 0.005 to 20 part(s) by mass of an inorganic filler (B) that has an average particle size of 3 µm or less, 0.05 to 3 part(s) by mass of a polyfunctional glycidyl group-containing styrene polymer (C) and 0.5 to 3 part(s) by mass of an infrared light-transmitting black dye (D), wherein the polyester resin composition satisfies the following requirements (1) and (2).

(1) An average value of transmittances, for wavelengths of 800 to 1100 nm, of a flat plate that is obtained from the polyester resin composition and has a thickness of 2 mm is 5% or higher and less than 20%.

(2) Color-L≤7.

[In the above formula, Color-L stands for a hue L* value according to an L*a*b* system of the CIE color difference system for a polyester resin composition.]

[2] The polyester resin composition according to [1], wherein the polyester resin (A) contains a polybutylene terephthalate resin (a) and a polyethylene terephthalate resin (b) in a ratio of from 100:0 to 50:50 in terms of a ratio by mass.

[3] The polyester resin composition according to [1] or [2], wherein the inorganic filler (B) contains one or more member(s) selected from talc, barium sulfate, calcium carbonate and titanium dioxide.

[4] A part for a lamp made of the polyester resin composition mentioned in any of [1] to [3].

Advantages of the Invention

One of characteristic features of the polyester resin composition of the present invention is that the polyester resin composition realizes a blackness with a high designing feature in spite of having an infrared light-transmitting property. It is also possible to prepare a polyester resin composition which is excellent in all of anti-fogging property, heat resistance and mechanical characteristics.

BEST MODE FOR CARRYING OUT THE INVENTION

Hereinafter, the present invention will be explained in detail.

[Polyester Resin (A)]

As to the polyester resin (A) which can be used in the present invention, it is preferred to be a polyester resin which contains a dicarboxylic acid ingredient and a diol ingredient as constitution units.

As to the dicarboxylic acid ingredient, it is preferred to be such a one which contains aromatic dicarboxylic acid as a main ingredient. The term reading the main ingredient means that it usually occupies 70 molar % or more, preferably 80 molar % or more, more preferably 90 molar % or more, and especially preferably 95 molar % or more, to total dicarboxylic acid units. Other than the aromatic dicarboxylic acid, an aliphatic dicarboxylic acid can be used.

As to the aromatic dicarboxylic acid, there may be exemplified terephthalic acid, isophthalic acid, orthophthalic acid, 2,6-naphthalenedicarboxylic acid, 1,3-naphthalenedicarboxylic acid, 1,4-naphthalenedicarboxylic acid, 1,5-naphthalenedicarboxylic acid, 2,7-naphthalenedicarboxylic acid, diphenyl-4,4'-dicarboxylic acid, 4,4'-biphenyl ether dicarboxylic acid, 1,2-bis(phenoxy)ethane-p,p'-dicarboxylic acid, and anthracene-dicarboxylic acid. Among them, terephthalic acid, isophthalic acid and 2,6-naphthalenedicarboxylic acid are preferred.

As to the aliphatic dicarboxylic acid, specific examples thereof are aliphatic or alicyclic dicarboxylic which typically has a carbon number of 2 to 40, such as oxalic acid, succinic acid, glutaric acid, adipic acid, sebacic acid, dodecane-dicarboxylic acid, dimer acid and cyclohexane-dicarboxylic acid.

Each of the above dicarboxylic acid ingredients may be used either solely or jointly by mixing two or more thereof.

Besides the dicarboxylic acid ingredient and the diol ingredient, it is also possible that a hydroxycarboxylic acid ingredient or a lactone ingredient is copolymerized. The amount thereof used therefor to total monomer ingredients is preferred to be 30 molar % or less, more preferred to be 20 molar % or less, and further preferred to be 10 molar % or less.

As to the diol ingredient, there are exemplified ethylene glycol, propylene glycol, 1,3-propanediol, 1,4-butanediol, 1,5-pentanediol, neopentyl glycol, 1,6-hexanediol, 3-methyl-1,5-pentanediol, 2-methyl-1,5-pentanediol, 2,2-diethyl-1,3-propanediol, 2-butyl-2-ethyl-1,3-propanediol, 1,9-nonanediol, 1,10-decanediol, 1,4-cyclohexanedimethanol, 1,3-cyclohexanedimethanol and 1,2-cyclohexanedimethanol. Among them, ethylene glycol, 1,3-propanediol and 1,4-butanediol are preferred.

As to the preferred polyester resin (A), there are exemplified polybutylene terephthalate, polyethylene terephthalate, polytrimethylene terephthalate, polybutylene naphthalate and polyethylene naphthalate.

An intrinsic viscosity (IV) of the polyester resin (A) determined by measuring its solution in o-chlorophenol at 25° C. is preferred to be from 0.36 to 1.60 dl/g, more preferred to be from 0.52 to 1.25 dl/g, and further preferred to be from 0.58 to 1.12 dl/g, and most preferred to be from 0.62 to 1.02 dl/g. When the intrinsic viscosity of (A) is from 0.36 to 1.60 dl/g, mechanical characteristic and a molding ability of the polyester resin composition of the present invention becomes good.

It is preferred that the polyester resin (A) of the present invention contains a polybutylene terephthalate resin (a) and a polyethylene terephthalate resin (b) in specific compounding amounts.

Further, in the present invention, it is also preferred to use a polytrimethylene terephthalate resin (c) and a polybutylene naphthalate resin (d) as the polyester resin (A). In that case, the polytrimethylene terephthalate resin (c) can be used as a substitute for the polyethylene terephthalate resin (b), and the polybutylene naphthalate resin (d) can be used as a substitute for the polybutylene terephthalate resin (a).

The polybutylene terephthalate resin (a) which can be used in the present invention is a polymer which is prepared by a common polymerizing method such as a polycondensation reaction using terephthalic acid or an ester-forming derivative thereof and 1,4-butanediol or an ester-forming derivative thereof as main ingredients. A butylene terephthalate repeating unit in the polymer is preferred to be 80 molar % or more, more preferred to be 90 molar % or more, further preferred to be 95 molar % or more, and most preferred to be 100 molar %. The polybutylene terephthalate resin (a) may also contain other copolymerizable ingredient within such an extent that its characteristic is not deteriorated thereby such as in about 20% by mass or less. Examples of the copolymer are polybutylene (terephthalate/isophthalate), polybutylene (terephthalate/adipate), polybutylene (terephthalate/sebacate), polybutylene (terephthalate/decanedicarboxylate), polybutylene (terephthalate/naphthalate) and poly(butylene/ethylene) terephthalate. Each of them may be used solely or two or more thereof may be used by mixing.

An intrinsic viscosity (IV) of the polybutylene terephthalate resin (a) which can be used in the present invention determined by measuring its solution in o-chlorophenol at 25° C. is preferred to be from 0.36 to 1.60 dl/g, more preferred to be from 0.52 to 1.25 dl/g, and further preferred to be from 0.58 to 1.12 dl/g, and most preferred to be from 0.62 to 1.02 dl/g. When the intrinsic viscosity of (a) is from 0.36 to 1.60 dl/g, mechanical characteristic and a molding ability of the polyester resin composition of the present invention becomes good.

With regard to the polybutylene naphthalate resin (d) which can be used in the present invention, explanations similar to the polybutylene terephthalate resin (a) apply.

The polyethylene terephthalate resin (b) which can be used in the present invention is a polymer which is prepared by a common polymerizing method such as a polycondensation reaction using terephthalic acid or an ester-forming derivative thereof and ethylene glycol or an ester-forming derivative thereof as main ingredients. An ethylene terephthalate repeating unit in the polymer is preferred to be 80 molar % or more, more preferred to be 90 molar % or more, further preferred to be 95 molar % or more, and most preferred to be 100 molar %. The polyethylene terephthalate resin (b) may also contain other copolymerizable ingredient within such an extent that its characteristic is not deteriorated thereby such as in about 20% by mass or less. Examples of the copolymer are polyethylene (terephthalate/isophthalate), polyethylene (terephthalate/adipate), polyethylene (terephthalate/sebacate), polyethylene (terephthalate/decanedicarboxylate), polyethylene (terephthalate/naphthalate), poly(ethylene/cyclohexane-dimethyl)/terephthalate, and poly(butylene/ethylene) terephthalate. Each of them may be used solely or two or more thereof may be used by mixing. When the above polyethylene terephthalate resin (b) is used, a molding ability and a surface external appearance become much better.

An intrinsic viscosity (IV) of the polyethylene terephthalate resin (b) which can be used in the present invention determined by measuring its solution in o-chlorophenol at 25° C. is preferred to be from 0.36 to 1.60 dl/g, more preferred to be from 0.45 to 1.35 dl/g, further preferred to be from 0.50 to 1.20 dl/g, and most preferred to be from 0.55 to 1.05 dl/g. When the intrinsic viscosity of (b) is from 0.36 to 1.60 dl/g, mechanical characteristic and a molding ability of the polyester resin composition of the present invention becomes good.

With regard to the polytrimethylene terephthalate resin (c) which can be used in the present invention, explanations similar to the polyethylene terephthalate resin (b) apply.

In the present invention, a compounding amount of the polybutylene terephthalate resin (a) and the polyethylene terephthalate resin (b) in terms of a ratio by mass ((a):(b)) is preferred to be from 100:0 to 50:50. The ratio ((a):(b)) is more preferred to be from 100:0 to 60:40, further preferred to be from 100:0 to 70:30, and especially preferred to be from 100:0 to 80:20. As a result of compounding with the polyethylene terephthalate resin (b), it is possible to enhance a surface external appearance of the resin composition. However, when the compounding amount exceeds 50 parts by mass, a releasing property of the resin composition upon an injection molding may be deteriorated, or a heat resistance of the resin may be lowered, or a crystallization gradually proceeds under a temperature environment within a range of 100° C.-200° C. due to a retardation of a crystallizing rate of the polyester resin composition whereby an infrared light-transmitting property may be gradually lowered.

In the present invention, total amount of the polybutylene terephthalate resin (a) and the polyethylene terephthalate resin (b) in the polyester resin (A) is preferred to be 80% by mass or more, more preferred to be 90% by mass or more, further preferred to be 95% by mass or more, and it can be 100% by mass.

In the above description for the compounding amount, "the polybutylene terephthalate resin (a)" may be given such a different reading that "at least one of the polybutylene terephthalate resin (a) and the polybutylene naphthalate resin (d)", and "polyethylene terephthalate resin (b)" may be given such a different reading that "at least one of the polyethylene terephthalate resin (b) and the polytrimethylene terephthalate resin (c)".

[Inorganic Filler (B) Having an Average Particle Size of 3 μm or Less]

The polyester resin composition of the present invention contains 0.005 to 20 part(s) by mass of the inorganic filler (B) to 100 parts by mass of the polyester resin (A).

The inorganic filler (B) can much more enhance a heat resistance and a rigidity and, further, it can also control a shrinking rate smaller. Particularly when the shrinking rate is large, a poor release may be resulted due to its embracing to a mold upon an injection molding or a strain may be resulted to a molded product if the molded product is in a large size or in a complicated shape. Accordingly, it is important to control the shrinking rate by using the inorganic filler (B).

When a content of the inorganic filler (B) is less than 0.005 part by mass, an effect for enhancing the heat resistance and the rigidity is small. When it is more than 20 parts by mass, the filler is oozed out whereby a surface smoothness which is necessary for a use as a lamp part is deteriorated.

In view of the enhancement of the heat resistance and the rigidity and also of the surface smoothness, the content of the inorganic filler (B) is preferred to be 0.2 part by mass or more and, further in view of the control of the shrinking rate, the content of the inorganic filler (B) is more preferred to be 5 parts by mass or more, and further preferred to be 8 parts by mass or more.

It is necessary that an average particle size (a 50% diameter of a volume cumulative particle size distribution) measured by means of a laser diffraction method of the above inorganic filler (B) is 3 μm or less. When the average particle size is more than 3 μm, an infrared light-transmitting property of the polyester resin composition may be lowered and, further, the surface smoothness may be deteriorated. The average particle size of the inorganic filler (B) is preferred to be 2.8 μm or less. As to the lower limit of the average particle size of the inorganic filler (B), it is preferred to be 0.05 μm in view of a suppression of aggregation (poor dispersing) and a handling property (easy feeding), etc.

It is preferred that the inorganic filler (B) contains one or more member(s) selected from talc, barium sulfate, calcium carbonate and titanium dioxide.

Among the above-mentioned inorganic fillers, talc acts as a crystal nucleus agent to the polyester resin, and can enhance a heat resistance of the polyester resin when it is added in a small amount. However, since talc has a relatively large particle size, a surface smoothness lowers due to its floating onto the resin surface when it is added in a large amount.

On the other hand, although barium sulfate, calcium carbonate and titanium dioxide cannot act as the crystal nucleus agent to the polyester resin, their particle size is small as compared with talc whereby the surface smoothness is apt to be maintained even when they are added in a large amount. In order to control a shrinking rate, it is better when the adding amount of the inorganic filler is large. Also, the use of barium sulfate, calcium carbonate and titanium dioxide is suitable.

In view of an enhancement of the heat resistance and the surface smoothness, it is preferred that a content of talc is 0.005 to 1 part by mass and a content of barium sulfate, calcium carbonate and titanium dioxide is 2 to 20 parts by mass. It is more preferred that the content of talc is 0.05 to 0.8 part by mass and the content of barium sulfate, calcium carbonate and titanium dioxide is 3 to 19 parts by mass. It is further preferred that the content of talc is 0.1 to 0.5 part by mass and the content of barium sulfate, calcium carbonate and titanium dioxide is 5 to 18 parts by mass. When the content of barium sulfate, calcium carbonate and titanium dioxide is within such range, it is also possible to control the shrinking rate.

As to the inorganic filler (B), when a small amount of talc is used together with at least one member selected from the group consisting of barium sulfate, calcium carbonate and titanium dioxide, it is now possible to achieve both of an effect of talc as a crystal nucleus agent and a reinforcing effect of filler at the same time and to greatly enhance the heat resistance while the surface smoothness is still maintained.

When a small amount of talc is used together with at least one member selected from the group consisting of barium sulfate, calcium carbonate and titanium dioxide, it is preferred that a total amount of at least one member selected from the group consisting of barium sulfate, calcium carbonate and titanium dioxide is from 99.8 to 80% by mass and an amount of talc is 0.2 to 20% by mass, when a total amount of the inorganic filler (B) is taken as 100% by mass.

Although the polyester resin composition of the present invention can achieve a good surface smoothness even when the inorganic filler (B) is not subjected to a surface treatment, it is also possible that the inorganic filler (B) may be subjected to the surface treatment for enhancing a compatibility and a dispersibility. When the surface treatment is performed, it is preferred that a type and/or amount of a surface treatment agent is adjusted so that a fogging is not deteriorated by a generation of gas.

As to the surface treatment, there are exemplified a treatment with a surface treating agent, a treatment with a fatty acid and a treatment with $SiO_2$—$Al_2O_3$. There is no particular limitation for the surface treating agent but it is possible to use, for example, an aminosilane coupling agent, an epoxysilane coupling agent, a titanate-type coupling agent and an aluminate-type coupling agent.

In the polyester resin composition of the present invention, there is achieved a big effect in enhancing the heat resistance and the rigidity and in controlling the shrinking rate due to the fact of containing the inorganic filler (B). Accordingly, although there is such a tendency that the infrared light-transmitting property lowers as compared with a case wherein no inorganic filler is contained therein, other important effects are achieved.

However, since the polyester resin composition of the present invention has a transmittance of from 5% to less than 20% (an average value of the transmittance of a flat plate of 2 mm thickness for wavelengths of 800 to 1100 nm), an effect of suppressing a temperature rise is significantly high as compared with a case wherein the transmittance is 0%.

[Polyfunctional Glycidyl Group-Containing Styrene Polymer (C)]

The polyester resin composition of the present invention contains 0.05 to 3 part(s) by mass of a polyfunctional glycidyl group-containing styrene polymer (C) to 100 parts by mass of the polyester resin (A).

As a result of setting a content of the polyfunctional glycidyl group-containing styrene polymer (C) within such a range, a gasifying ingredient such as a liberated organic carboxylic acid can be efficiently captured whereby an excellent low gas emission property can be achieved.

When the content of the polyfunctional glycidyl group-containing styrene polymer (C) is more than 3 parts by mass, a gelling may occur by a reaction with the polyester resin (A) or an infrared light-transmitting property may be lowered due to a problem in terms of compatibility. When the content of the polyfunctional glycidyl group-containing styrene polymer (C) is less than 0.05 part by mass, the capturing effect for the liberated organic carboxylic acid may become small whereby the low gas emission property may be deteriorated. The content of the polyfunctional glycidyl group-containing styrene polymer (C) to 100 parts by mass of the polyester resin (A) is preferred to be 0.1 to 2 part(s) by mass and more preferred to be 0.15 to 1 part by mass.

It is preferred that the polyfunctional glycidyl group-containing styrene polymer (C) used in the present invention has a good compatibility with the polyester resin (A) and has a small difference in a refractive index from the polyester resin (A). Its weight-average molecular weight (Mw) and epoxy value are preferred to be 1000 or more and 0.5 meq/g or more, respectively. The epoxy value is more preferred to be 1.0 meq/g or more.

As to the specific ingredient for the polyfunctional glycidyl group-containing styrene polymer (C), it is preferred to be a copolymer of a glycidyl group-containing unsaturated monomer with a vinyl aromatic monomer.

As to the glycidyl group-containing unsaturated monomer, there may be exemplified a glycidyl unsaturated carboxylate and an unsaturated glycidyl ether. As to the glycidyl unsaturated carboxylate, there may be exemplified glycidyl acrylate, glycidyl methacrylate and monoglycidyl itaconate. The preferred one is glycidyl methacrylate. As to the unsaturated glycidyl ether, there may be exemplified vinyl glycidyl ether, allyl glycidyl ether, 2-methylallyl glycidyl ether and methacryl glycidyl ether. The preferred one is methacryl glycidyl ether.

As to the vinyl aromatic monomer, there may be exemplified styrene monomers such as styrene, methylstyrene, dimethylstyrene and ethylstyrene. The preferred one is styrene.

With regard to a copolymerizing rate of the glycidyl group-containing unsaturated monomer to the vinyl aromatic monomer, the copolymerizing amount of the glycidyl group-containing unsaturated monomer is preferred to be 1 to 30% by mass and more preferred to be 2 to 20% by mass. When the copolymerizing amount of the glycidyl group-containing unsaturated monomer is less than 1% by mass, an effect for inhibiting a crystallinity may be small and an infrared light-transmitting property cannot be sufficiently achieved and, moreover, the capturing effect for the liberated organic carboxylic acid may become small showing a tendency of badly affecting the low gas emission property. When it is more than 30% by mass, a stability as a resin composition may be deteriorated.

Within such a range that a compatibility with the polyester resin (A) is not deteriorated, it is also possible to copolymerize a monomer such as a $C_{1-7}$ alkyl ester of acrylic acid or methacrylic acid (e.g., a (meth)acrylate monomer such as methyl, ethyl, propyl, isopropyl or butyl (meth) acrylate), a (meth)acrylonitrile monomer, a vinyl ester monomer such as vinyl acetate or vinyl propionate, a (meth) acrylamide monomer, maleic anhydride and monoester or diester of maleic acid and the like. However, there is a tendency that an α-olefin such as ethylene, propylene or butene-1 deteriorates the compatibility with the polyester resin (A) whereby it is preferred not to use the α-olefin.

A preferable polyfunctional glycidyl group-containing styrene polymer (C) is a polyfunctional glycidylstyrene acrylic polymer having a weight-average molecular weight (Mw) of 1000 or more and having an epoxy value of 0.5 meq/g or more. The weight-average molecular weight (Mw) is more preferred to be 5000 or more, further preferred to be 7000 or more, and especially preferred to be 8000 or more. When the weight-average molecular weight (Mw) is less than 1000, a content of the glycidyl group per molecule becomes small and the capturing effect for the liberated organic carboxylic acid becomes low. The weight-average molecular weight (Mw) is preferred to be 50000 or less in view of the compatibility with the polyester resin (A). Also, the epoxy value is more preferred to be 0.6 meq/g or more, and further preferred to be 0.65 meq/g or more. When the epoxy value is less than 0.5 meq/g, the capturing effect for the liberated organic carboxylic acid becomes low. The epoxy value is preferred to be 3 meq/g or less in view of suppressing an excessive reaction with the polyester resin (A).

[Infrared Light-Transmitting Black Dye (D)]

The polyester resin composition of the present invention contains 0.5 to 3 part(s) by mass of an infrared light-transmitting black dye (D) to 100 parts by mass of the polyester resin (A).

When the content of the infrared light-transmitting black dye (D) is less than 0.5 part by mass, a resulting blackness may be insufficient whereby a designing feature may be deteriorated. When it is more than 3 parts by mass, a bleeding-out and a fogging may cause a problem. The content of the infrared light-transmitting black dye (D) is more preferred to be 0.5 to 2 part(s) by mass and further preferred to be 0.5 to 1.5 part(s) by mass.

As to the infrared light-transmitting black dye (D), known dyes can be used and one kind of dye may be used solely or two or more kinds of dyes may be mixed and used. Since the polyester resin composition of the present invention is a crystalline resin. In a crystalline resin, it is frequently difficult to achieve a dark color due to a high whiteness degree derived from a crystalline phase. Accordingly, a black color is more easily expressed when two or more kinds of dyes are mixed to tone the color whereby such a method is preferred.

As to a dye which can be added to the polyester resin composition, there may be exemplified quinoline dyes, anthraquinone dyes and perinone dyes. They exhibit a good heat resistance and are hardly thermally-decomposed upon a compounding and an injection molding of the polyester resin composition.

In view of the heat resistance and a fogging property, a molecular weight per molecule of the infrared light-transmitting black dye is preferred to be 350 or more, more preferred to be 380 or more, and further preferred to be 400 or more. A melting point thereof is preferred to be 150° C. or higher, more preferred to be 180° C. or higher, and further preferred to be 200° C. or higher. When any of the molecular weight and the melting point satisfy the range, it is good. When both of the molecular weight and the melting point satisfy the range, it is particularly preferred. When two or more kinds of the infrared light-transmitting dyes are mixed and used, it is preferred if the molecular weight and the melting point of each of the dyes satisfy the above range.

However, even when the molecular weight and the melting point satisfy the above range, an evaporation of the dye may be induced by an evaporation of a gasifying ingredient due to such a reason that an interaction with the gasifying ingredient contained in the resin is high. In the present invention, anthraquinone dyes and perinone dyes are preferably used in view of the fogging property. A more preferable one is a mixtured dye of the anthraquinone dye and the perinone dye. A particularly preferred example of the infrared light-transmitting black dye (D) is a mixtured dye of the anthraquinone dye and the perinone dye each having the molecular weight of 350 or more and the melting point of 150° C. or higher. As to a master batch containing the dyes as such, "Infrared light-transmitting dye master batch: PBF-TT2399B-PBT (manufactured by Resino Color Industry Co., Ltd.)" can be used.

The dye may be added directly to the resin upon a compounding or may be added as a master batch. In view of a dispersibility and a handling property, it is preferred to add as the master batch.

As to the infrared light-transmitting black dye which is commercially available as the master batch, a content of the dye is usually about 5 to 20% by mass although it depends upon types of a base resin and a dye used therefor.

When the infrared light-transmitting black dye is added as the master batch, it is preferred that a hue of master batch pellets (measured in a pellet shape) is such a one wherein a hue $L^*$ value (Color-L) is 22 or less, a hue $a^*$ value (Color-a) is from −1.5 to 1.5, and a hue $b^*$ value (Color-b) is from −1.5 to 1.5, according to an $L^*a^*b^*$ system of the CIE color difference system. (Any of them is the value measured by an SCE method.)

As a result of the fact that the hue of the master batch of the infrared light-transmitting black dye is within the above range, the polyester resin composition of the present invention can achieve a satisfactory blackness without deteriorating a dispersibility and a handling property of the dye.

When the hue of the master batch is out of the above range, the blackness of the polyester resin composition may not be well achieved whereby a designing feature may be deteriorated.

It is more preferred that the hue of the master batch pellets is such a one wherein the hue $L^*$ value (Color-L) is 21 or less, the hue $a^*$ value (Color-a) is from −1 to 1, and the hue $b^*$ value (Color-b) is from −1 to 1, according to the $L^*a^*b^*$ system of the CIE color difference system. (Any of them is a value measured by an SCE method.)

As a result of the fact that the polyester resin composition of the present invention has the above-mentioned constitutions, an average value of transmittances, for wavelengths of 800 to 1100 nm, of a flat plate that is obtained from the polyester resin composition and has a thickness of 2 mm is 5% or higher and less than 20%. Details of the measurement of the transmittance are mentioned under an item of Examples. Briefly speaking, it is measured by a spectrophotometer using a flat plate in 2=thickness prepared by an injection molding of the polyester resin composition with a mold temperature of 60° C. The average value is a quotient obtained by dividing a sum of transmittances in each of the wavelengths of 800 to 1100 nm by a measured number. The measured number may vary depending upon a sampling pitch. When the sampling pitch is 1 nm for example, there are obtained transmittance data per nm such as 800, 801, 802, . . . , 1098, 1099 and 1100 nm whereby the measured number is 301. Therefore, in such a case, the average value of the transmittances for the wavelengths of 800 to 1100 nm is determined by dividing the sum of the transmittances in each of the wavelengths by 301.

When the average value of the transmittances for the wavelengths of 800 to 1100 nm is within such a range, a temperature is hardly increased even when a sunlight is concentrated.

The characteristics of the polyester resin composition of the present invention are that the infrared light-transmitting property is enhanced while the blackness having a high designing feature is still achieved and that the excellent heat resistance is achieved by using the inorganic filler. As a result thereof, the temperature is hardly increased and a surface melting hardly occurs even if the sunlight is concentrated.

Although it is possible that the average value of the transmittances for the wavelength of 800 to 1100 nm is made 20% or higher when a content of the inorganic filler is small and a crystallinity of the resin composition is significantly lowered. However, the rigidity and the heat resistance are deteriorated thereby and, accordingly, such a means is not preferred. When the average value of the transmittances for the wavelength of 800 to 1100 nm is less than 5%, the temperature may be extremely increased due to the concentration of the sunlight. The average value of the transmittances for the wavelength of 800 to 1100 nm is preferred to be 10% or more and 18% or less.

As a result of the fact that the polyester resin composition of the present invention has the above constitutions, its hue $L^*$ value (Color-L) according to an $L^*a^*b^*$ system of the CIE color difference system is 7 or less (the value being measured according to the SCE method).

As a result of the fact that the $L^*$ value is 7 or less, the polyester resin composition of the present invention can have a sufficient blackness and, even in a molded product prepared by a melt molding or the like, the sufficient blackness can also be expressed whereby it is excellent in terms of a designing feature. The hue $L^*$ value is preferably 6 or less and more preferably 5 or less. When the hue $L^*$ value is more than 7, the blackness is insufficient and the designing feature is low.

It is preferred that a heat deflection temperature of the polyester resin composition of the present invention under a load of 0.45 MPa is 130° C. or higher. The heat deflection temperature is measured in accordance with the description under an item of Examples.

When the heat deflection temperature is lower than 130° C., a heat resistance is insufficient and the composition may not be used particularly in such a use wherein the heat resistance is demanded. When the heat deflection temperature is 130° C. or higher, it can be said that the polyester resin composition satisfies the heat resistance as the resin for a lamp part. It is more preferred that the heat deflection temperature is 135° C. or higher and, in such a case, the heat resistance as a lamp part is more highly satisfactory. It is much more preferred to be 140° C. or higher and, in such a case, it can be said to be far highly satisfactory.

When the average value of the transmittances for the wavelengths of 800 to 1100 nm is made 20% or more by reducing a content of the inorganic filler and by significantly reducing a crystallinity of the resin composition, the heat deflection temperature may frequently become lower than 130° C. whereby that is not preferred.

In the polyester resin composition of the present invention, a haze value of a glass plate after a fogging test (160° C.) can be made 5% or less. In accordance with the present invention, a generation of gas can be effectively suppressed and an excellent anti-fogging property can be achieved.

When an amount of the generated gas is much and the haze value of the glass plate after the fogging test (160° C.) is more than 5%, there is a problem of fogging in terms of a practical use as various kinds of lamp parts. Moreover, a mold is apt to be stained upon an injection molding whereby a product quality and a productivity may be affected thereby.

The fogging test may be carried out according to the following method.

Small pieces in a size of about 40 mm×40 mm are cut out from an injection molded product (2 mm in thickness). Some of the pieces (total 10 g) are placed in a glass tube (such as in 65 mm diameter and 80 mm height) for which an aluminum foil is covered to form a bottom. Then, the glass tube is set on a hot plate. The glass tube is further covered with a slide glass (such as that in 78 mm×76 mm×1 mm thickness) so that there is no gap therein. Then, the glass tube is subjected to a heat treatment at 160° C. for 24 hours. (As a result of this heat treatment, an adhered product such as a decomposed product sublimed from the polyester resin composition is separated out onto an inner wall of the slide glass.) A haze value of the slide glass is measured by a haze meter or the like.

In the polyester resin composition of the present invention, it is preferred that a transmittance, for the wavelengths of 300 to 700 nm, of the flat plate in 2=thickness prepared from the polyester resin composition is substantially 0%. Measurement of the transmittance for the above wavelengths is the same as that mentioned already.

The term reading "substantially" means that a noise upon the measurement is not taken into consideration. When it is 0±0.05%, that can be usually considered as substantially 0%. In the present invention, when the transmittance for the wavelengths of 300 to 700 nm is within a range of 0±0.05%, it is considered to be substantially 0%.

When the transmittance for the wavelengths of 300 to 700 nm is substantially 0%, a hiding ability for a visible light is high and a designing feature is high whereby that is preferred. When the transmittance for the wavelengths of 300 to 700 nm exceeds 0% (or substantially 0%), the hiding ability for visible light is not sufficient whereby the designing feature is low.

In order to much more enhance a releasing property, the polyester resin composition of the present invention may contain a releasing agent within such an extent that the characteristic of the present invention is not deteriorated thereby.

A content of the releasing agent is preferred to be 0.1 to 3 part(s) by mass to 100 parts by mass of the polyester resin (A). When the content of the releasing agent is less than 0.1 part by mass, a releasing effect may not be sufficiently achieved and a poor release from the mold, wrinkles formed upon the release, etc. may cause problems. The releasing agent has such a problem that the agent itself becomes a gas or is bled out whereby it stains a mold or generates a fog (fogging) by adhering to a lens cover, a mirror, etc. under a temperature environment within a range of 100 to 200° C. When the content of the releasing agent is more than 3 parts by mass, such a problem becomes significant.

There is no particular limitation for a type of the releasing agent provided that it can be used for polyester. Examples thereof are a long-chain fatty acid or ester or metal salt thereof, amide compound, polyethylene wax, silicone and polyethylene oxide. As a long-chain fatty acid, that having 12 or more carbons is particularly preferred. Its examples are stearic acid, 12-hydroxystearic acid, behenic acid and montanic acid. Carboxylic acid therein may be partially or wholly esterified by monoglycol or polyglycol or may form a metal salt. Examples of the amide compound are ethylene bisterephthalamide and methylene bisstearylamide. Each of those releasing agents may be used solely or as a mixture thereof.

In addition to the above, the polyester resin composition of the present invention may contain various kinds of additives within a known range upon necessity within such an extent that the characteristic of the present invention is not deteriorated thereby. Examples of the known additive are a heat-resisting stabilizer, an antioxidant, an ultraviolet ray absorber, a stabilizer against light, a plasticizer, a modifying agent, an antistatic agent and a flame retardant.

In the polyester resin composition of the present invention, the ingredients (A), (B), (C) and (D) occupy preferably 85% by mass or more, more preferably 90% by mass or more, and further preferably 95% by mass or more in terms of a total amount thereof.

With regard to a method for producing the polyester resin composition of the present invention, the composition can be produced by mixing the above-mentioned ingredients together, if necessary, with various types of stabilizers followed by subjecting to melting and kneading. As to a method for melting and kneading, any of the methods being well known among persons skilled in the art may be used. It is possible to use a uniaxial kneader, a biaxial kneader, a pressure kneader, Banbury mixer, etc. Among them, it is particularly preferred to use the biaxial kneader. General conditions for the melting/kneading are such that, in the case of the biaxial kneader, a cylinder temperature is 230 to 270° C. and a kneading time is 2 to 15 minutes.

There is no particular limitation for a method of molding the polyester resin composition of the present invention. Any of the known methods such as an injection molding, an extrusion molding and a blow molding may be used. Among them, the injection molding method is preferably used in view of its broad applicability.

In the molded product of the polyester resin composition of the present invention, a light-reflecting metal layer may be directly formed (by means of a vapor deposition) at least on a part of a surface thereof. There is no particular limitation for the vapor deposition method but known methods may be used.

The molded product using the polyester resin composition of the present invention is advantageously used as design parts (particularly as lamp parts). For example, it may be used as parts of lamps for automobiles (headlamp, etc.) and light reflectors (extension, reflector, housing, etc.) and further as parts for illuminating instruments, electric and electronic parts, sundry goods for household use, etc.

EXAMPLES

Hereinafter, the present invention will be more specifically illustrated by way of Examples although the present invention shall not be limited to those Examples. The measured values mentioned in Examples are those measured by the following methods.

(1) Transmittance of Infrared Light (Wavelength: 800 to 1100 nm)/Visible Light (Wavelength: 300 to 700 nm)

Molding was conducted using an injection molding machine starting from pellets prepared in Examples and Comparative Examples. A molded product in a flat plate of 100 mm×100 mm×2 mm thickness was prepared using the injection molding machine EC-100 N (manufactured by Toshiba Machine). The molding was conducted at a cylinder temperature of 260° C. and a mold temperature of 60° C.

Transmittances for the wavelengths of 300 to 1500 nm were measured using a spectrophotometer UV-3150 (manufactured by Shimadzu). A sampling pitch was 1.0 nm. A slit width was (12). A white plate of a barium sulfate type was used as a standard white plate. Average value of the transmittances for the wavelengths of 800 to 1100 nm (quotient of a sum of the transmittances in each of the wavelengths divided by 301) was calculated.

Transmittances for the wavelengths of 300 to 700 nm were also measured by the same method.

(2) Hue

Hue of a flat plate of the polyester resin composition was measured by the following method.

A molded product of in flat plate of 100 mm×100 mm×2 mm thickness was prepared by an injection molding using an injection molding machine EC-100 N (manufactured by Toshiba Machine). A mold used therefor had a surface polished by a file of #6000 on one side. The molding was conducted at a cylinder temperature of 260° C. and at a mold temperature of 60° C.

A hue $L^*$ value (CIE color difference system) of the polished surface side of the molded plate was measured in accordance with JIS Z 8722 and JIS Z 8781-4 using a spectral colorimeter of a precise type (TC-1500 SX manufactured by Tokyo Denshoku). The measurement was conducted by a 0°-d method of an SCE system. A light source used therefor was D65, and a field was 10°.

A hue of an infrared light-transmitting black dye master batch pellets was measured by the following method.

Pellets were placed in an attached case using a spectral colorimeter of a precise type (TC-1500 SX manufactured by Tokyo Denshoku) and set on a rotating stand. The measurement was conducted in accordance with JIS Z 8722 and JIS Z 8781-4 whereupon a hue $L^*a^*b^*$ value (CIE color difference system) was measured. The measurement was conducted by a 0°-d method of an SCE system. A light source used therefor was D65, and a field was 10°.

(3) Haze Value

Small pieces in a size of about 40 mm×40 mm were cut out from an injection molded product in 2 mm thickness. Some of the pieces (total 10 g) were placed in a glass tube (65 mm diameter×80 mm height) for which an aluminum foil is covered to form a bottom. Then, the glass tube was set on a hot plate (Neohot Plate HT-1000 manufactured by AS ONE Corporation). Then the glass tube was covered by a slide glass (78 mm×76 mm×1 mm thickness) and subjected to a heat treatment at 160° C. for 24 hours. As a result of this heat treatment, an adhered product such as a decomposed product sublimed from the polyester resin composition was separated out onto an inner wall of the slide glass. A haze value of the slide glass was measured by a haze meter (NDH 2000 manufactured by Nippon Denshoku Kogyo).

(4) External Appearance

A molded product of in flat plate of 100 mm×100 mm×2 mm thickness was prepared by an injection molding using an injection molding machine EC-100 N (manufactured by Toshiba Machine). A mold used therefor had a surface polished by a file of #6000 on one side. In the molding, a cylinder temperature was 260° C., a mold temperature was 60° C. and a cycle time was 40 seconds. The molding was conducted at a slow injection speed whereby a floating of a filler was apt to be formed on a surface. The polished surface of the molded product was evaluated by naked eyes in terms of deficiencies (a whitening and a coarse surface) due to the floating of the filler.

∘∘: Neither whitening nor coarse surface were noted at all.

∘: Although the whitening and the coarse surface were slightly noted depending upon an angle for an observation by the naked eyes, they were within such an extent of practically no problem.

Δ: The whitening and the coarse surface were noted.

x: The whitening and the coarse surface were significantly noted.

(5) External Appearance after Annealing

The molded flat plate used in the evaluation for the "(4) External appearance" was subjected to an annealing treatment by placing it for 4 hours in a shelf-type constant-temperature drier set at 130° C. Then, the polished surface of the molded product was evaluated by naked eyes in terms of deficiencies (a whitening and a coarse surface) due to the floating etc. of the filler.

∘∘: Neither the whitening nor the coarse surface were noted at all.

∘: Although the whitening and the coarse surface were slightly noted depending upon an angle for an observation by the naked eyes, they were within such an extent of practically no problem.

Δ: The whitening and the coarse surface were noted.

x: The whitening and the coarse surface were significantly noted.

(6) Heat Deflection Temperature (Applied Load: 0.45 MPa)

A heat deflection temperature (HDT) was used as an index for a heat resistance of the resin composition. A multi-purpose test piece of ISO 3167 was molded using an injection molding machine (EC-100 N manufactured by Toshiba Machine) and its HDT was measured in accordance with ISO 75 with an applied load of 0.45 MPa.

Compounding ingredients used in Examples and Comparative Examples are shown below.

Polyester Resin (A):

Polybutylene terephthalate resin (a): IV=0.83 dl/g, acid value=30 eq/t

Polyethylene terephthalate resin (b): IV=0.62 dl/g, acid value=30 eq/t

Polytrimethylene terephthalate resin (c): IV=93 dl/g, Cortera (manufactured by Shell)

Inorganic Filler (B):

An average particle size shown below is a value measured by means of a laser diffraction method (50% diameter of a volume cumulative particle size distribution).

(B-1) Talc (average particle size: 2.6 μm): Micro Ace SG-95 (manufactured by Nippon Talc)

(B-2) Talc (average particle size: 12.0 μm): Talcun PK-C (manufactured by Hayashi Kasei)

(B-3) Precipitated barium sulfate (average particle size: 0.7 μm): B-54 (manufactured by Sakai Chemical Industry)

(B-4) Barium sulfate (average particle size: 11.6 μm): BMH-100 (manufactured by Sakai Chemical Industry)

(B-5) Calcium carbonate (average particle size: 1.8 μm): SCP E-#2010 (manufactured by Hayashi Kasei)

(B-6) Calcium carbonate (average particle size: 20.0 μm): SCP E-#45 (manufactured by Hayashi Kasei)

(B-7) Titanium dioxide (average particle size: 0.6 μm): PF-739 (manufactured by Ishihara Sangyo)

Polyfunctional glycidyl group-containing styrene acrylic polymer (C):

(C-1) ARUFONUG-4050 (manufactured by Toagosei; Mw: 8500; epoxy value: 0.67 meq/g; refractive index: 1.55)

(C-2) ARUFONUG-4070 (manufactured by Toagosei; Mw: 9700; epoxy value: 1.4 meq/g; refractive index: 1.57)

Infrared Light-Transmitting Black Dye (D):

(D-1) Infrared light-transmitting dye master batch: PBF-TT2399B-PBT (PBT (polybutylene terephthalate) resin-based black dye master batch, a toned product based on a mixture of an anthraquinone dye and a perinone dye; content of the dye: 10% by mass in total; manufactured by Resino Color Industry); hue of pellets: Color-L=19.5, Color-a=−0.2, Color-b=−0.9

Dye Other than that in Black Color:

Dye in purple color: DCC-VO 1301 (manufactured by Ningbo DCC Chemicals)

Pigment in black color: Carbon black (manufactured by Mitsubishi Chemical)

Releasing Agent:

Triglycerin full behenate: Poem TR-FB (manufactured by Riken Vitamin)

Stabilizer:

Antioxidant: Irganox 1010 (manufactured by BASF)

Examples 1 to 12 and Comparative Examples 1 to 10

Ingredients being compounded according to combinations shown in Tables 1 and 2 were subjected to compounding using a co-rotating biaxial extruder wherein the cylinder temperature was set at 260° C. Then, a resulting strand was cooled with water to make into pellets. Each of resulting pellets was dried at 130° C. for 4 hours and used for each of the above evaluation tests. Results are shown in Tables 1 and 2.

TABLE 1

| | Types | | | Example 1 | Example 2 | Example 3 | Example 4 | Example 5 | Example 6 |
|---|---|---|---|---|---|---|---|---|---|
| Compounding composition | Polyester resin (A) | | (a) | 90 | 80 | 70 | 70 | 70 | 70 |
| | | | (b) | | 10 | 20 | 20 | 20 | 20 |
| | | | (c) | | | | | | |
| | Inorganic filler (B) | | B-1 | 0.3 | 0.3 | | | | |
| | | | B-2 | | | | | | |
| | | | B-3 | | | 10 | 10 | 10 | |
| | | | B-4 | | | | | | |
| | | | B-5 | | | | | | 10 |
| | | | B-6 | | | | | | |
| | | | B-7 | | | | | | |
| | Polyfunctional glycidyl group-containing styrene acrylic polymer (C) | | C-1 | 0.5 | 0.5 | 0.5 | 0.25 | | 0.5 |
| | | | C-2 | | | | | 0.25 | |
| | Black dye (D) | | D-1 | 10 | 10 | 10 | 10 | 10 | 10 |
| Characteristics | Transmittance (wavelengths: 800 to 1100 nm) | | % | 15 | 16 | 12 | 12 | 12 | 13 |
| | Transmittance (wavelengths: 300 to 700 nm) | | % | 0 | 0 | 0 | 0 | 0 | 0 |
| | Hue L* value | | — | 4 | 4 | 4 | 4 | 4 | 4 |
| | Haze | | % | 2 | 3 | 3 | 4 | 3 | 3 |
| | External appearance | | — | ∘∘ | ∘∘ | ∘∘ | ∘∘ | ∘∘ | ∘ |
| | External appearance after annealing | | — | ∘∘ | ∘∘ | ∘∘ | ∘∘ | ∘∘ | ∘ |
| | Heat deflection temperature | | ° C. | 153 | 136 | 135 | 135 | 136 | 135 |

TABLE 1-continued

| | Types | | Example 7 | Example 8 | Example 9 | Example 10 | Example 11 | Example 12 |
|---|---|---|---|---|---|---|---|---|
| Compounding composition | Polyester resin (A) | (a) | 70 | 70 | 70 | 70 | 55 | 70 |
| | | (b) | 20 | 20 | 20 | 20 | 35 | |
| | | (c) | | | | | | 20 |
| | Inorganic filler (B) | B-1 | | | 1 | 1 | 1 | |
| | | B-2 | | | | | | |
| | | B-3 | | 15 | 10 | 10 | 10 | 10 |
| | | B-4 | | | | | | |
| | | B-5 | | | | | | |
| | | B-6 | | | | | | |
| | | B-7 | 10 | | | 2 | | |
| | Polyfunctional glycidyl group-containing styrene acrylic polymer (C) | C-1 | 0.5 | 0.5 | 0.5 | 0.5 | 0.5 | 0.5 |
| | | C-2 | | | | | | |
| | Black dye (D) | D-1 | 10 | 10 | 10 | 10 | 10 | 10 |
| Characteristics | Transmittance (wavelengths: 800 to 1100 nm) | % | 10 | 11 | 12 | 11 | 13 | 12 |
| | Transmittance (wavelengths: 300 to 700 nm) | % | 0 | 0 | 0 | 0 | 0 | 0 |
| | Hue L* value | — | 5 | 4 | 4 | 4 | 4 | 4 |
| | Haze | % | 3 | 3 | 3 | 3 | 4 | 3 |
| | External appearance | — | ∘∘ | ∘∘ | ∘∘ | ∘∘ | ∘∘ | ∘∘ |
| | External appearance after annealing | — | ∘∘ | ∘ | ∘∘ | ∘∘ | ∘ | ∘∘ |
| | Heat deflection temperature | °C. | 133 | 140 | 145 | 146 | 135 | 137 |

The compounding composition is expressed in terms of part (s) by mass. The content of black dye (D) is expressed as a content of master batch.
The composition contains 0.3% by mass of releasing agent and 0.2% by mass of stabilizer (antioxidant) per 100 parts by mass of polyester resin (A)
Releasing agent: triglycerin full behenate: Poem TR-FB (manufactured by Riken Vitamin)
Stabilizer: Irganox 1010 (manufactured by BASF)

TABLE 2

| | Types | | Comparative Example 1 | Comparative Example 2 | Comparative Example 3 | Comparative Example 4 | Comparative Example 5 |
|---|---|---|---|---|---|---|---|
| Compounding composition | Polyester resin (A) | (a) | 70 | 90 | 70 | 70 | 70 |
| | | (b) | 20 | | 20 | 20 | 20 |
| | Inorganic filler (B) | B-1 | | | | | 1 |
| | | B-2 | | 0.3 | | | |
| | | B-3 | | | | | 15 |
| | | B-4 | | | 10 | | |
| | | B-5 | | | | | |
| | | B-6 | | | | 10 | |
| | | B-7 | | | | | 10 |
| | Polyfunctional glycidyl group-containing styrene acrylic polymer (C) | C-1 | 0.5 | 0.5 | 0.5 | 0.5 | 0.5 |
| | Black dye (D) | D-1 | 10 | 10 | 10 | 10 | 10 |
| | Dye other than that in black color | | | | | | |
| | Pigment in black color | | | | | | |
| Characteristics | Transmittance (wavelengths: 800 to 1100 nm) | % | 22 | — | — | — | — |
| | Transmittance (wavelengths: 300 to 700 nm) | % | 0 | — | — | — | — |
| | Hue L* value | — | 4 | 4 | 4 | 4 | 5 |
| | Haze | % | 4 | 2 | 4 | 4 | 4 |
| | External appearance | — | ∘∘ | Δ | Δ | Δ | Δ |
| | External appearance after annealing | — | ∘ | Δ | Δ | Δ | x |
| | Heat deflection temperature | °C. | 122 | 153 | 140 | 141 | 150 |

| | Types | | Comparative Example 6 | Comparative Example 7 | Comparative Example 8 | Comparative Example 9 | Comparative Example 10 |
|---|---|---|---|---|---|---|---|
| Compounding composition | Polyester resin (A) | (a) | 70 | 70 | 76 | 80 | 80 |
| | | (b) | 20 | 20 | 20 | 20 | 20 |
| | Inorganic filler (B) | B-1 | 1 | | | | |
| | | B-2 | | | | | |
| | | B-3 | 25 | 10 | 10 | 10 | 10 |
| | | B-4 | | | | | |
| | | B-5 | | | | | |
| | | B-6 | | | | | |
| | | B-7 | | | | | |
| | Polyfunctional glycidyl group-containing styrene acrylic polymer (C) | C-1 | 0.5 | | 0.5 | 0.5 | 0.5 |
| | Black dye (D) | D-1 | 10 | 10 | 4 | | |
| | Dye other than that in black color | | | | | 2 | |
| | Pigment in black color | | | | | | 1 |
| Characteristics | Transmittance (wavelengths: 800 to 1100 nm) | % | — | 12 | 12 | 12 | 0 |
| | Transmittance (wavelengths: 300 to 700 nm) | % | — | 0 | 0 | 0 | 0 |
| | Hue L* value | — | 4 | 4 | 8 | 9 | 4 |
| | Haze | % | 4 | 7 | 4 | 4 | 4 |

TABLE 2-continued

|  |  |  |  |  |  |  |
|---|---|---|---|---|---|---|
| External appearance | — | Δ | ○○ | ○○ | ○○ | ○○ |
| External appearance after annealing | — | x | ○○ | ○○ | ○○ | ○○ |
| Heat deflection temperature | ° C. | 152 | 135 | 135 | 135 | 135 |

The compounding composition is expressed in terms of part (s) by mass. The content of black dye (D) D-1 is expressed as a content of master batch.
The composition contains 0.3% by mass of releasing agent and 0.2% by mass of stabilizer (antioxidant) per 100 parts by mass of polyester resin (A)
Releasing agent: triglycerin full behenate: Poem TR-FB (manufactured by Riken Vitamin)
Stabilizer: Irganox 1010 (manufactured by BASF)

As shown in Table 1, in the molded products prepared from the polyester resin compositions of the present invention in Examples 1 to 12, their infrared light transmittance was 5% or higher and less than 20%, and they had such excellent visible light masking property and blackness that the visible light transmittance was 0% and the Color-L was 7 or less, and their haze value of glass plates after the fogging test was as good as 5% or less whereby it was noted that they exhibited good characteristics. Moreover, the heat deflection temperature of any of them was 130° C. or higher whereby it was noted that they also exhibited excellent heat resistance. Both of the external appearance after the molding and that after the annealing were also good.

In Comparative Example 1 containing no inorganic filler, although the infrared light transmittance became high, the heat deflection temperature became low.

In Comparative Examples 2 to 4 using the inorganic filler having the average particle size of more than 3 μm, both of external appearance and that after annealing were worse as compared with the Examples. Since good molding product was not prepared, the transmittance was not measured.

In Comparative Examples 5 and 6 wherein the adding amount of the inorganic filler (B) was more than the stipulated range, the external appearance became worse as compared with the Examples and the external appearance after annealing became far worse. Since good molding product was not prepared, the transmittance was not measured.

In Comparative Example 7 containing no polyfunctional glycidyl group-containing styrene polymer (C), the fogging property became worse as compared with Examples 3 to 5.

In Comparative Example 8 wherein the content of the infrared light-transmitting black dye (D) was less than 0.5 part by mass and in Comparative Example 9 wherein a purple dye was used, the hue L* value became 7 or more and sufficient blackness could not be achieved. In Comparative Example 10 to which a black pigment was added, the infrared light transmittance was 0%.

INDUSTRIAL APPLICABILITY

The polyester resin composition of the present invention achieves the infrared light transmitting property while achieving the blackness with high designing feature. In addition, both of the heat resistance and the low gas emission property are excellent. Accordingly, the polyester resin composition of the present invention is suitable for use as design parts (particularly for use as lamp parts which are suffered from a problem of a surface melting due to concentration of the sunlight). An utilization value thereof in the industry is great.

The invention claimed is:

1. A polyester resin composition containing, per 100 parts by mass of a polyester resin (A), 0.005 to 20 part(s) by mass of an inorganic filler (B) that has an average particle size of 3 μm or less, 0.05 to 3 part(s) by mass of a polyfunctional glycidyl group-containing styrene polymer (C) and 0.5 to 3 part(s) by mass of an infrared light-transmitting black dye (D), wherein the polyester resin composition satisfies the following requirements (1) and (2):
   (1) An average value of transmittances, for wavelengths of 800 to 1100 nm, of a flat plate that is obtained from the polyester resin composition and has a thickness of 2 mm is 5% or higher and less than 20%,
   (2) Color-L≤7,
   wherein, in the above formula, Color-L stands for a hue L* value according to an L*a*b* system of the CIE color difference system for a polyester resin composition.

2. The polyester resin composition according to claim 1, wherein the polyester resin (A) contains a polybutylene terephthalate resin (a) and a polyethylene terephthalate resin (b) in a ratio of from 100:0 to 50:50 in terms of a ratio by mass.

3. The polyester resin composition according to claim 1, wherein the inorganic filler (B) contains one or more member(s) selected from talc, barium sulfate, calcium carbonate and titanium dioxide.

4. A part for a lamp made of the polyester resin composition mentioned in claim 1.

* * * * *